March 10, 1964   W. A. V. THOMSEN   3,124,373
THREADLESS COUPLING
Filed May 31, 1960
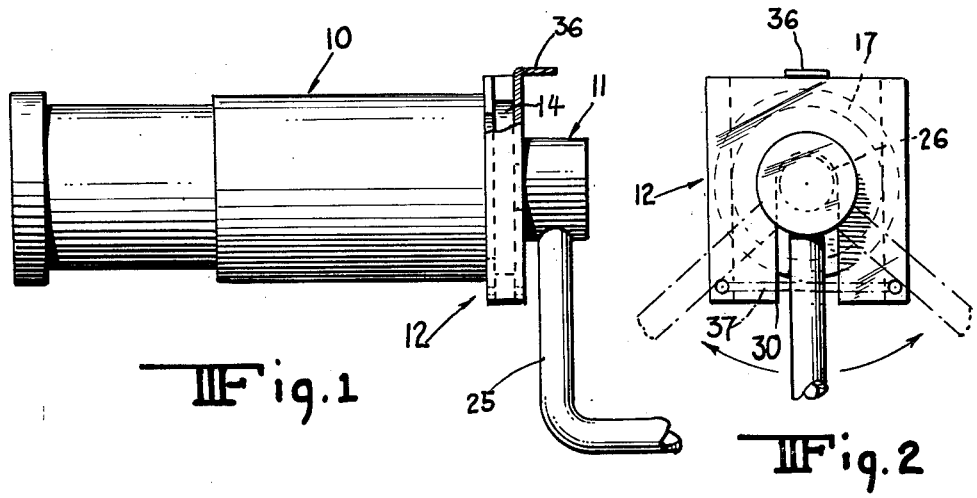
Fig. 1
Fig. 2
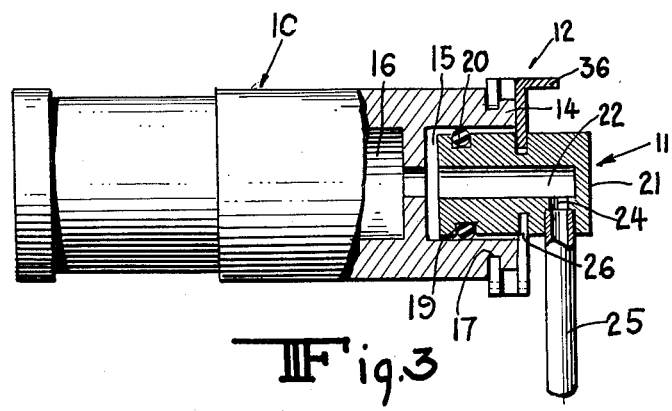
Fig. 3
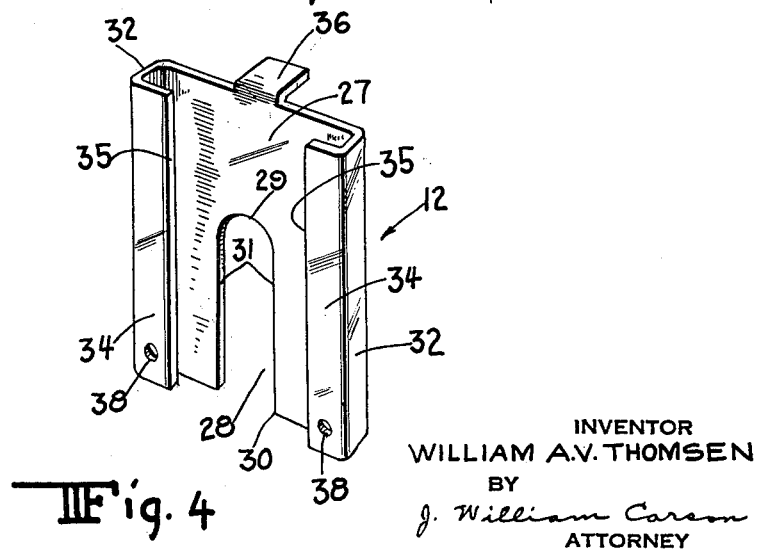
Fig. 4
INVENTOR
WILLIAM A.V. THOMSEN
BY
J. William Carson
ATTORNEY

United States Patent Office 3,124,373
Patented Mar. 10, 1964

3,124,373
THREADLESS COUPLING
William A. V. Thomsen, Glen Ridge, N.J., assignor to Specialties Development Corporation, Belleville, N.J., a corporation of New Jersey
Filed May 31, 1960, Ser. No. 32,799
3 Claims. (Cl. 285—18)

The present invention relates to couplings, and more particularly, to a threadless coupling for a member inserted in another member to couple the members.

Heretofore, it has been customary to connect fluid conveying tubing and the like to another member such as a valve by providing the valve with an exteriorly threaded nipple and rotatably mounting a nut on the end of the tubing adapted to be threaded onto the nipple to secure the tubing to the valve. Such threading operation, both to connect and disconnect the tubing, is time consuming and requires the use of a wrench for tightening and loosening the nut.

Accordingly, an object of the present invention is to provide a coupling which eliminates threading operations, does not require the use of tools, and is rapidly applied and removed.

Another object is to provide such a coupling which in addition to connecting fluid lines has a wide variety of uses where a member inserted into another member is to be coupled thereto.

Another object is to provide such a coupling which enables a pair of members to be rotatably coupled so that one member can be turned with respect to the other.

A further object is to provide such a coupling which is simple and economical in construction and is reliable in operation.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are generally accomplished by providing a threadless coupling comprising in combination a first member having an opening and recess means at its exterior disposed in a plane intersecting the axis of the opening, a second member inserted into the opening and having a recess means at its exterior disposed outwardly of the opening and in a plane parallel to the plane in which the recess means of the first member is disposed, and a retainer having two pairs of spaced parallel inwardly facing edges disposed in parallel planes and extending into the recess means to couple the members.

A preferred embodiment of the invention has been chosen for purposes of illustration and description, and is shown in the accompanying drawing, forming a part of the specification, wherein:

FIG. 1 is a side elevational view of the coupling members.

FIG. 2 is a front view.

FIG. 3 is a sectional view taken along the lines 3—3 on FIG. 2.

FIG. 4 is a perspective view of an element for coupling the members together.

Referring to the drawing in detail, there is shown a threadless coupling generally comprising a first member 10 such as valve body which is partially shown, a second member 11 such as a tubing connector, and a retainer 12 such as a key or slider plate for coupling the connector to the valve body.

The valve body 10 has a boss or extension 14 formed with a central bore or opening 15 communicating with a fluid flow passageway 16, and the boss has recess means 17 on the exterior thereof disposed in a plane which intersects the axis of the opening, for example, perpendicularly as shown in FIG. 3. Preferably as shown herein, the boss and the bore are cylindrical, and the recess means is an annular recess (FIG. 2), however, it is contemplated that the boss could be rectangular and provided with a recess at opposite sides and that the bore could be of any desired shape in cross-section other than circular.

The tubing connector 11 is dimensioned to be inserted into the bore 15 and is provided with a groove 19 for receiving an O-ring 20 which surrounds the connector and forms a seal between it and the bore. The connector as shown in FIG. 3 has a closed end 21, an axial passageway 22 extending from the closed end to the valve body passageway 16, an aperture 24 at its side communicating with the passageway 22 and having the end of a tube or conduit 25 inserted and sealed therein; and recess means 26 such as an annular recess disposed outwardly of the bore and in a plane parallel to the plane in which the recess means 17 is disposed, the planes being closely spaced apart. While the connector 11 is shown herein as being cylindrical, it is contemplated that it could be rectangular at its outer end and be provided with a recess at opposite sides each disposed adjacent to a recess of a rectangular boss.

The retainer 12 (FIG. 4) comprises a plate portion 27 having a slot 28 formed with a closed end 29 and an open end 30 and providing a pair of spaced inwardly facing edges 31 adapted to extend into the recess means 26 of the connector 11, and having an L-shaped edge portion 32 at opposite sides of the slot each having a tab portion 34 and providing a pair of inwardly facing parallel edges 35 disposed in a plane parallel to the plate portion and being adapted to extend into the recess means 17 of the valve body 10.

As shown herein, the closed end 29 of the slot 28 is semi-circular, and the distance between the edges 31 is equal to the diameter of the recess 26 to enable the closed end and the edges to fit into the recess. The distance between the edges 35 is equal to the diameter of the recess 17 to provide a close fit for the edges in the recess.

If desired, the key is provided with a tab 36 or extension adjacent the closed end of the slot to facilitate manipulation thereof in inserting and removing the same. Also, in order to prevent unintentional uncoupling or separation of the key from the coupled members, provision is made for closing the open end of the slot, for example, by means of a seal wire 37 (FIG. 2) strung through apertures 38 in the tab portions 34 of the plate portion.

With the arrangement as shown in FIG. 2, the connector 11 can be turned with respect to the valve body 10 even after the key has been applied to adjust the position of the tube 25. However, if such rotation is not desired, the body and the connector can be provided with parallel recesses as previously described which are adapted to receive the edges 31 and 35 of the key, whereby the key locks the valve body and the connector against turning as well as relative axial movement.

It will also be appreciated that the connector 11 could be eliminated by providing a tube with the annular recess 26 and a groove 19 for receiving the O-ring 20 to further simplify the coupling. Such an arrangement is feasible where the tube has sufficient wall thickness to form the groove 19 and the recess without unduly weakening the tube.

From the foregoing description, it will be seen that the present invention provides an improved threadless coupling for tubing and other elements which coupling is simple, economical and reliable.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. In a threadless coupling, the combination of a first member having a central bore and having an annular sunken recess at its exterior disposed in a plane intersecting the axis of said bore and being concentric with said bore; a second member inserted into said bore and having an annular sunken recess at its exterior of much smaller diameter than said first mentioned recess and being disposed outwardly of said bore and in a plane parallel to and closed adjacent the plane in which said recess of said first member is disposed and being concentric with said bore; and a one-piece key having a rectangular plate portion formed with a lengthwise extending elongate slot at the middle thereof and being provided with an open end at one end of said plate portion and with a semi-circular closed end and providing a pair of spaced inwardly facing parallel edges extending into said recess of said second member with the edge provided by said semi-circular closed end being seated in said last mentioned recess, and said key having an L-shaped formation on one face at opposite sides extending lengthwise from one end of said plate portion to the other and providing a pair of spaced inwardly facing parallel edges disposed in a plane parallel to and closely adjacent the plane in which said first mentioned pair of edges are provided and being spaced apart a much greater distance than said first mentioned pair of edges and extending into said recess of said first member, whereby said members are coupled.

2. A coupling according to claim 1, wherein said plate portion has a tab at the end thereof nearest the closed end of said slot extending substantially at right angles to and away from the face of said plate portion opposite the face on which said L-shaped formations are provided.

3. A coupling according to claim 2, wherein means are provided on said key at the end where the open end of said slot is located for preventing unintentional separation of said key from said members.

References Cited in the file of this patent

UNITED STATES PATENTS

| | | |
|---|---|---|
| 693,367 | Brooke | Feb. 18, 1902 |
| 1,611,869 | Anderson | Dec. 28, 1926 |
| 2,240,078 | Rader | Apr. 29, 1941 |
| 2,320,780 | Jennings | June 1, 1943 |
| 2,523,995 | Parmesan | Sept. 26, 1950 |
| 2,772,898 | Seeler | Dec. 4, 1956 |

FOREIGN PATENTS

| | | |
|---|---|---|
| 24,094 | Great Britain | Dec. 16, 1895 |